(12) United States Patent
Zhai et al.

(10) Patent No.: US 9,660,316 B2
(45) Date of Patent: May 23, 2017

(54) MILLIMETER WAVE DUAL-MODE DIPLEXER AND METHOD

(71) Applicant: Huawei Technologies Co., Ltd., Shenzhen (CN)

(72) Inventors: Wenyao Zhai, Kanata (CA); Vahid Miraftab, Ottawa (CA); Halim Boutayeb, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 14/557,107

(22) Filed: Dec. 1, 2014

(65) Prior Publication Data

US 2016/0156373 A1    Jun. 2, 2016

(51) Int. Cl.
*H01P 1/213* (2006.01)
*H04B 1/00* (2006.01)

(52) U.S. Cl.
CPC .......... *H01P 1/213* (2013.01); *H01P 1/2135* (2013.01); *H01P 1/2138* (2013.01); *H04B 1/0057* (2013.01)

(58) Field of Classification Search
CPC ...... H01P 1/213; H01P 1/2135; H01P 1/2138; H01P 5/12; H04B 1/0057
USPC ........................................ 333/134, 135, 132
See application file for complete search history.

(56) References Cited

U.S. PATENT DOCUMENTS

| 4,168,479 A | 9/1979 | Rubin | |
| 6,831,231 B2 * | 12/2004 | Perelman | H01B 11/1826 174/102 R |
| 8,090,411 B2 | 1/2012 | Korevaar et al. | |
| 2004/0085153 A1 * | 5/2004 | Fukunaga | H01P 5/107 333/33 |
| 2008/0150821 A1 | 6/2008 | Koch et al. | |
| 2012/0242421 A1 | 9/2012 | Robin et al. | |
| 2012/0274419 A1 * | 11/2012 | Lee | H01P 1/182 333/157 |
| 2013/0154759 A1 * | 6/2013 | Morita | H01P 3/081 333/26 |

(Continued)

FOREIGN PATENT DOCUMENTS

| CN | 101227794 A | 7/2008 |
| CN | 202474153 U | 10/2012 |

(Continued)

OTHER PUBLICATIONS

Lee et al., "A V-Band Front-End With 3-D Integrated Cavity Filters/Duplexers and Antenna in LTCC Technologies," IEEE Transaction on Microwave Theory and Techniques, vol. 54, No. 7, Jul. 2006, pp. 2925-2936.

(Continued)

*Primary Examiner* — Benny Lee
*Assistant Examiner* — Jorge Salazar, Jr.
(74) *Attorney, Agent, or Firm* — Slater Matsil, LLP

(57) ABSTRACT

An embodiment millimeter wave diplexer includes a substrate integrated waveguide (SIW) high pass filter (HPF), a microstrip line low pass filter (LPF), and a T-junction. The SIW HPF is coupled to a first port, and the microstrip line LPF is coupled to a second port. The SIW HPF is operable in a first frequency band, and the microstrip line LPF is operable in a second frequency band. The T-junction is coupled between the SIW HPF and the microstrip line LPF. The T-junction is also coupled to a common port.

23 Claims, 12 Drawing Sheets

(56) References Cited

U.S. PATENT DOCUMENTS

2015/0077195 A1* 3/2015 Khanna ................ H01P 1/2135
 333/134

FOREIGN PATENT DOCUMENTS

| | | |
|---|---|---|
| EP | 2510574 B1 | 4/2015 |
| JP | H0371702 A | 3/1991 |

OTHER PUBLICATIONS

Suntives et al., "Dual-Mode High-Speed Data Transmission Using Substrate Integrated Waveguide Interconnects," Electrical Performance of Electronic Packaging, 2007 IEEE, Oct. 29-31, 2007, pp. 215-218.

* cited by examiner

MILLIMETER WAVE DUAL-MODE DIPLEXER AND METHOD

TECHNICAL FIELD

The present invention relates generally to millimeter wave diplexers and, in particular embodiments, to a millimeter wave diplexer that uses dual-mode transmissions and methods of construction and use thereof.

BACKGROUND

It is common in dual-band millimeter wave (mmW) systems for the two frequency bands to share common high-frequency inputs and outputs. Diplexers are used to separate a received dual-band signal into its single-band components. Diplexers are usually passive devices that can operate in either direction, which is to perform frequency domain multiplexing in one direction and to perform frequency domain de-multiplexing in the opposite direction.

SUMMARY

An embodiment millimeter wave diplexer includes a substrate integrated waveguide (SIW) high pass filter (HPF), a microstrip line low pass filter (LPF), and a T-junction. The SIW HPF is coupled to a first port, and the microstrip line LPF is coupled to a second port. The SIW HPF is operable in a first frequency band, and the microstrip line LPF is operable in a second frequency band. The T-junction is coupled between the SIW HPF and the microstrip line LPF. The T-junction is also coupled to a common port.

An embodiment method of constructing a millimeter wave diplexer includes forming a bottom metallic layer. The method also includes forming a dielectric layer over the bottom metallic layer. The dielectric layer includes a SIW HPF operable in a first frequency band. The method also includes forming a top metallic layer over the dielectric layer. The top metallic layer includes a microstrip line LPF and a T-junction. The microstrip line LPF is operable in a second frequency band. The T-junction is coupled between the microstrip line LPF and the SIW HPF, and is further coupled to a common port.

An embodiment method of diplexing a dual-band signal includes receiving the dual-band signal at a common input port. The method also includes propagating a transverse electromagnetic (TEM) mode component of the dual-band signal through a microstrip line LPF tuned to a first cutoff frequency for a first frequency band. The method also includes propagating a transverse electrical (TE) mode component of the dual-band signal through a SIW HPF tuned to a second cutoff frequency for a second frequency band.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

It is realized herein a mmW diplexer can be constructed using a dual-mode structure. In certain embodiments the dual-mode structure can be constructed with two metallic layers and a dielectric layer. It is further realized herein a combination of a substrate integrated waveguide (SIW) structure and a microstrip line structure can be used to separate a dual-band signal into transverse electrical (TE) mode and transverse electromagnetic (TEM) mode components. It is further realized herein the TE and TEM mode paths can include low pass and high pass filters tuned for distinct frequency bands. Once a dual-band signal is diplexed, an embodiment diplexer can deliver the separated TE and TEM mode components to a dual-mode structure.

Figure 1:
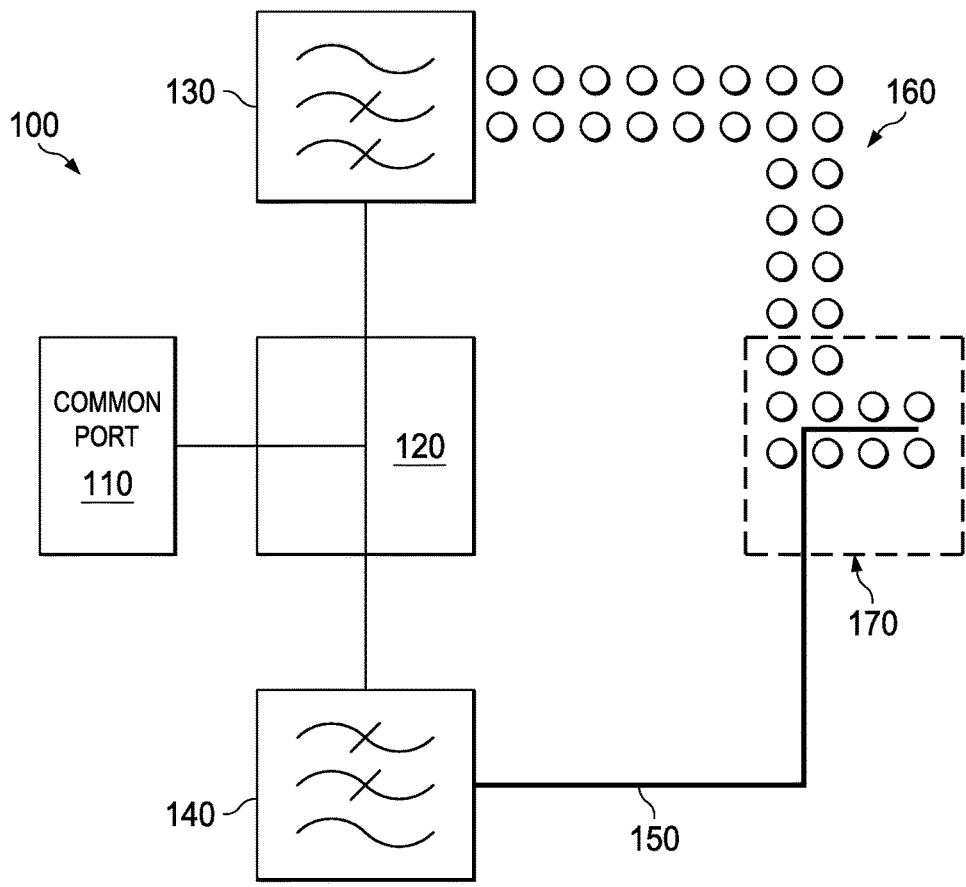
FIG. 1 is a block diagram of one embodiment of a millimeter wave diplexer.

FIG. 1 is a block diagram of one embodiment of a millimeter wave diplexer 100. Diplexer 100 includes a common port 110, a T-junction 120, a high pass filter (HPF) 130, and a low pass filter (LPF) 140. A dual-band signal is received at common port 110 and is split into a TE mode path 160 and a TEM mode path 150 by T-junction 120. Common port 110 and T-junction 120 can both be implemented as microstrip line components in a metallic layer. TE mode path 160 includes HPF 130, which can be tuned to a particular frequency band. TEM mode path 150 includes LPF 140, which can be tuned to another frequency band. The precise frequency band of operation for HPF 130 and LPF 140 can vary per embodiment. For example, in one embodiment, HPF 130 is designed for an E-band signal and LPF 140 is designed for a local multipoint distribution service (LMDS) band signal. E-band signals generally are in the 71-76 GHz and 81-86 GHz frequency bands, while LMDS band signals generally are in the 26 GHz, 29 GHz, and 31.0 through 31.3 GHz frequency bands. Both TE mode path 160 and TEM mode path 150 lead to a dual-band system 170 where the TE mode component and the TEM mode component of the received dual-band signal are processed separately.

In certain embodiments, HPF 130 is implemented in a SIW structure. The dual-band signal arrives at common port 110 as a TEM mode signal. The SIW HPF structure converts the TEM mode signal to a TE mode signal. In certain embodiments, LPF 140 is implemented as a microstrip line distributed L-C circuit with tunable poles corresponding to the frequency band for TEM path 150.

Figure 2A:
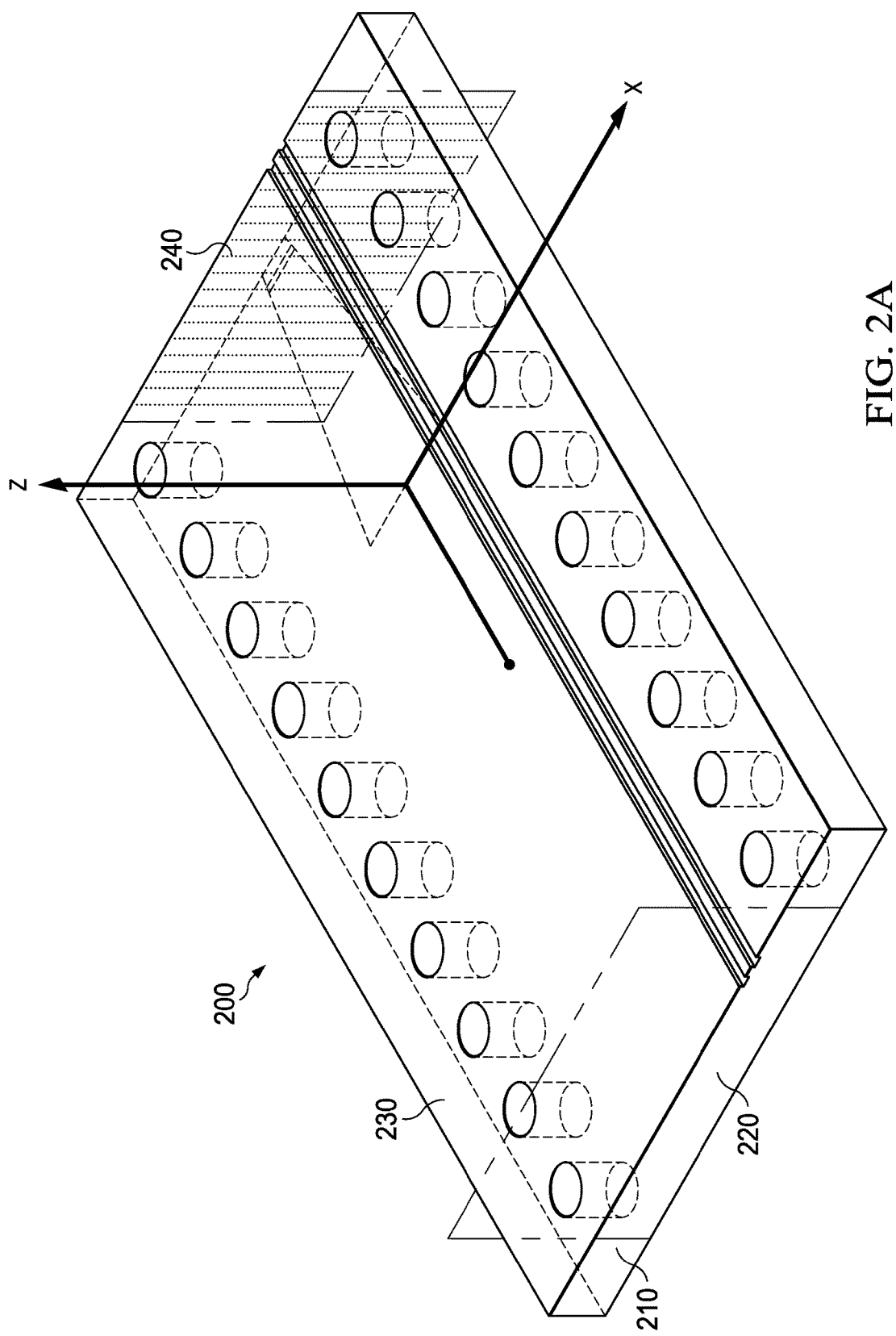
FIGS. 2A-2C are diagrams illustrating one embodiment of a dual-mode system.
Figure 2B:
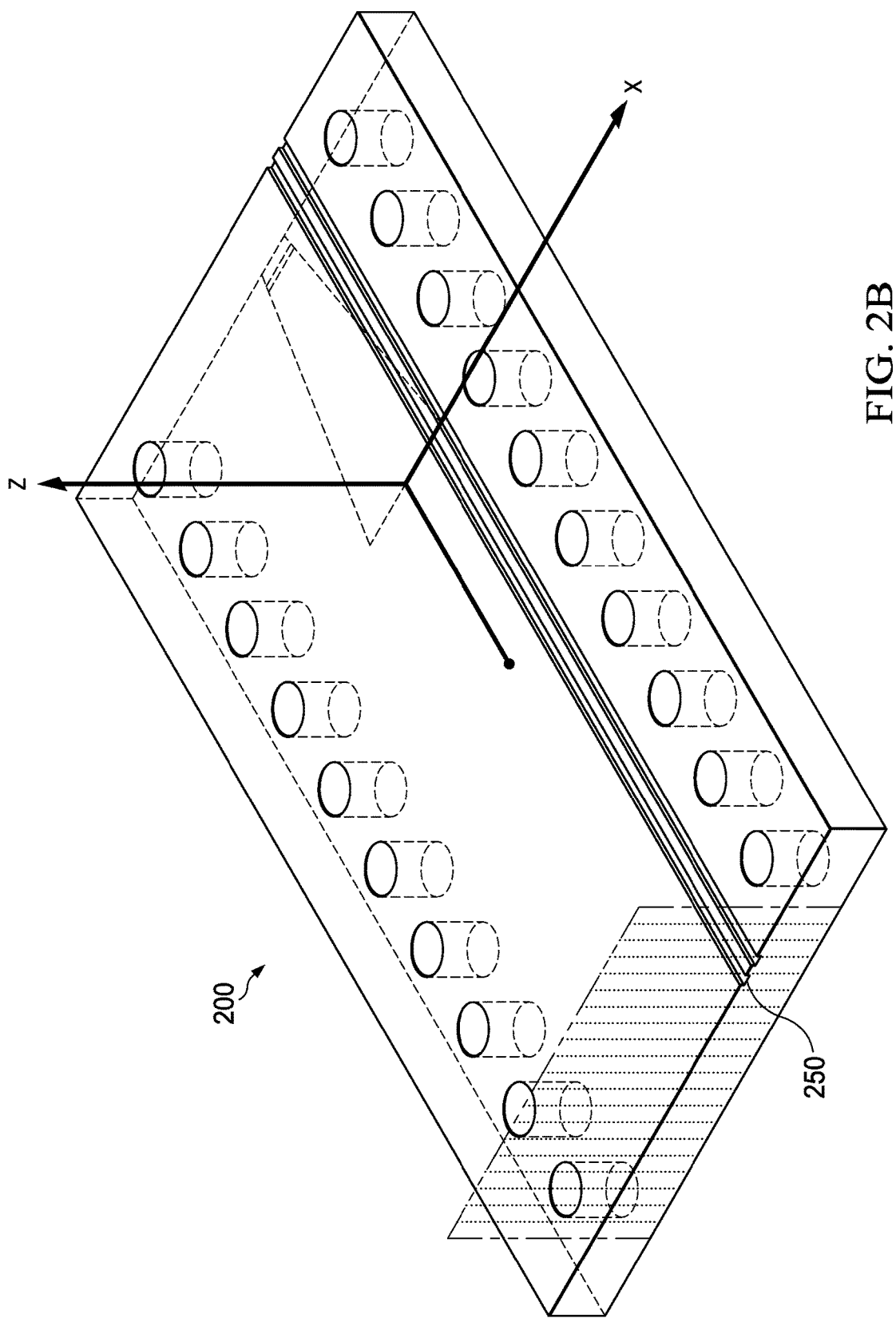
Figure 2C:
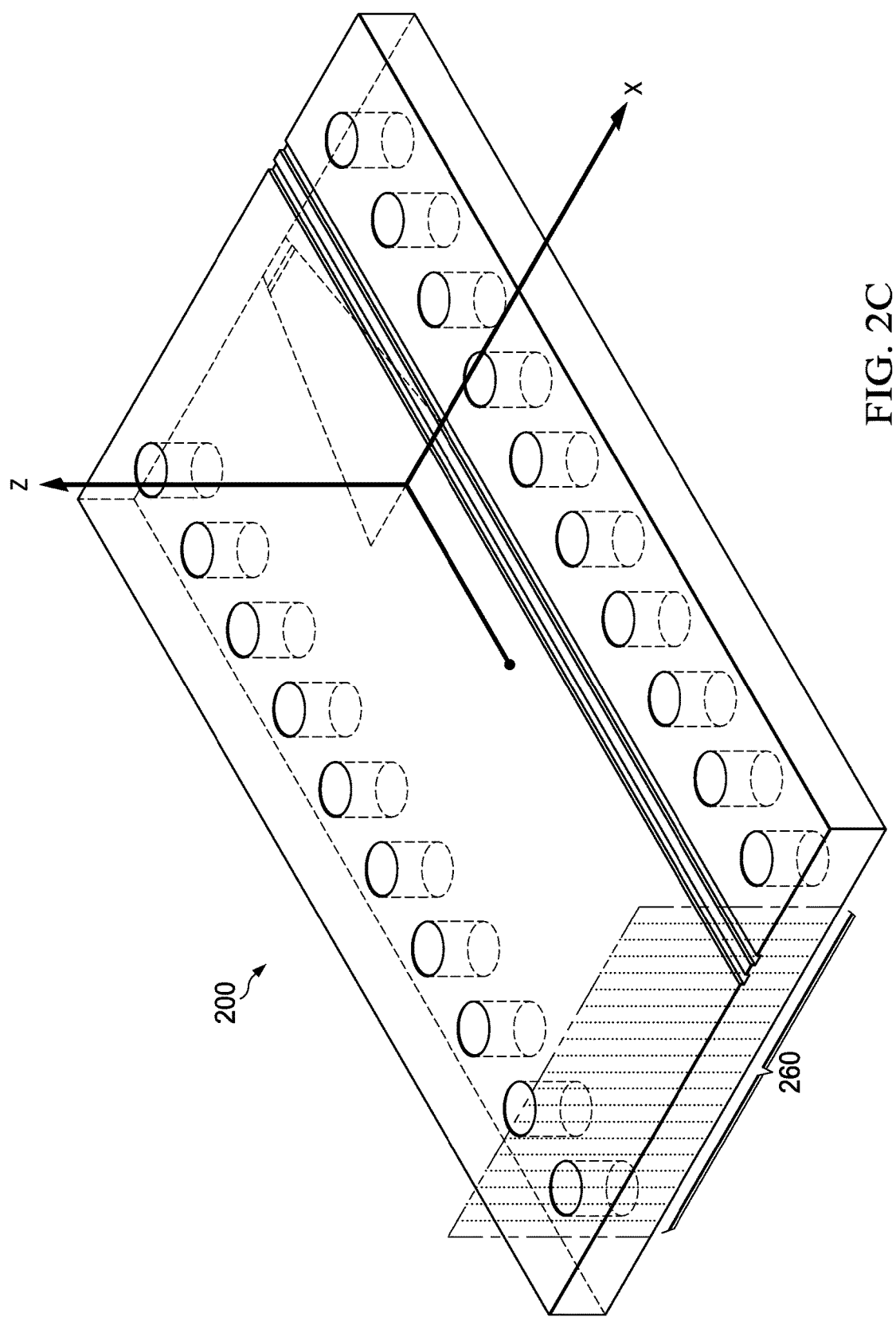

FIGS. 2A-2C are diagrams illustrating one embodiment of a dual-mode system 200. Dual-mode system 200, as depicted in FIG. 2A, includes a bottom metallic layer 210, a dielectric layer 220, which is sometimes referred to as a substrate layer, and a top metallic layer 230. At a microstrip line input port 240, a dual-band signal arrives at dual-mode system 200. FIG. 2B illustrates a TEM mode path 250 that includes microstrip traces in top metallic layer 230. FIG. 2C illustrates a TE mode path 260 through an SIW structure in dielectric layer 220.

Figure 3:
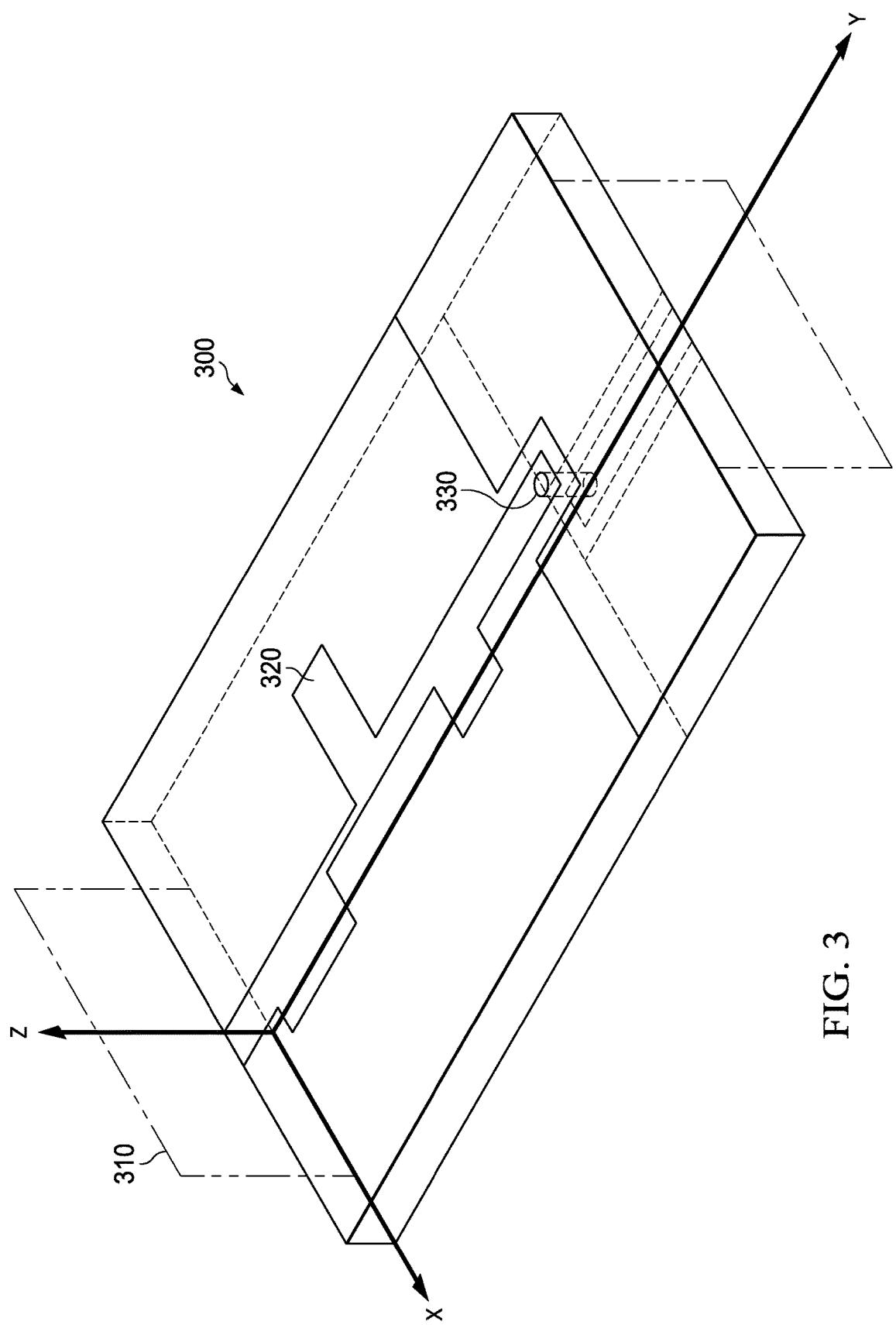
FIG. 3 is a diagram of one embodiment of a microstrip line low pass filter.

FIG. 3 is a diagram of one embodiment of a microstrip line low pass filter (LPF) 300. The microstrip line structure of LPF 300 includes top and bottom metallic layers separated by a dielectric layer, similar to those of dual-mode system 200 in FIGS. 2A and 2B. LPF 300 includes an input port 310 and a distributed L-C circuit 320. LPF 300 also includes a via and landing pad 330 that operates as an additional L-C pole. The distributed L-C circuit in the embodiment of FIG. 3 includes seven LPF poles designed with a cut-off frequency for a particular frequency band. For example, in an embodiment where the LPF is tuned for the LMDS band, the L-C poles can be designed with a 55 GHz cutoff. LPF 300 is configured to propagate a TEM mode signal.

Figure 4A:
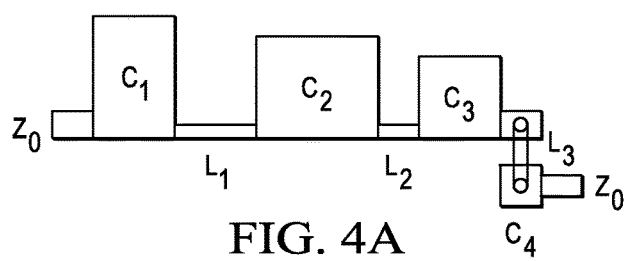
FIGS. 4A and 4B are diagrams of two schematic representations of one embodiment of a distributed L-C circuit.
Figure 4B:
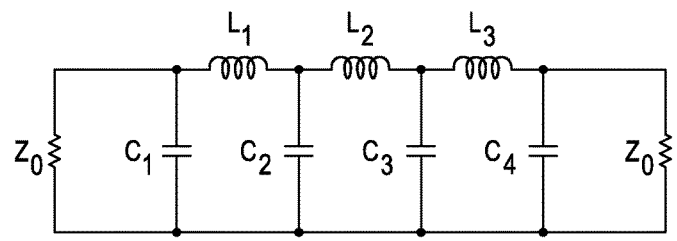

FIGS. 4A and 4B are diagrams of two schematic representations of distributed L-C circuit 320 of LPF 300 in FIG. 3. FIG. 4A graphically illustrates distributed L-C circuit 320, which includes matched impedances $Z_0$, capacitances $C_1$, $C_2$, $C_3$, and $C_4$, and inductances $L_1$, $L_2$, and $L_3$. FIG. 4A also illustrates the via between metallic layers of LPF 300 and the landing pad, which is represented by inductances $L_3$, capacitance $C_4$, and impedance $Z_0$. FIG. 4B illustrates an equivalent circuit for distributed L-C circuit 320, including matched impedances $Z_0$, capacitances $C_1$, $C_2$, $C_3$, and $C_4$, and inductances $L_1$, $L_2$, and $L_3$.

Figure 5:
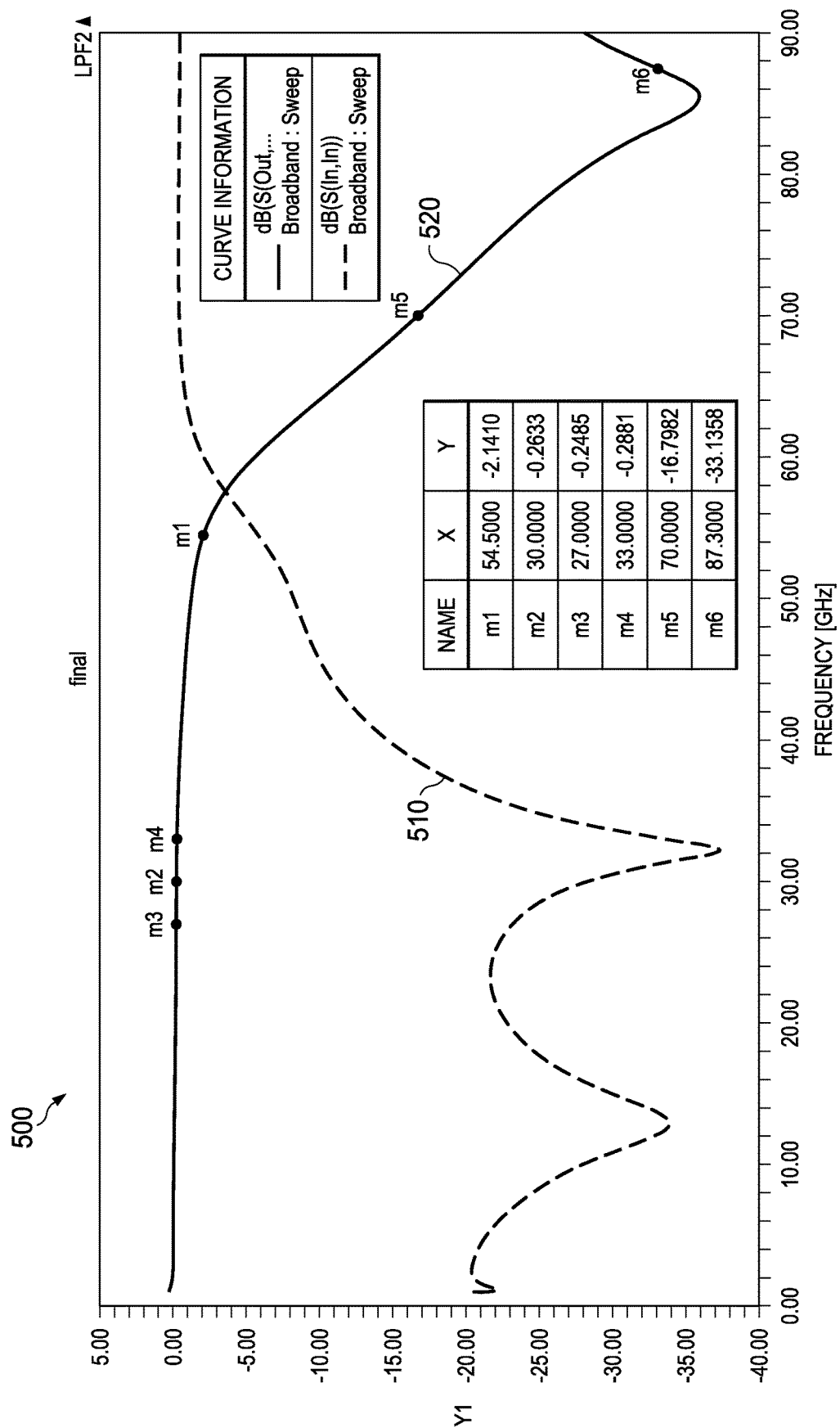
FIG. 5 is a plot of a small signal analysis of one embodiment of a microstrip line LPF.

FIG. 5 is a plot 500 of a small signal analysis of the microstrip line LPF embodiment of FIG. 3. Plot 500 plots a frequency response curve, expressed in dBs, against a frequency range expressed in GHz. Plot 500 illustrates a small signal parameter S11 510 and another small signal parameter S21 520. Plot 500 also exhibits a cutoff frequency of roughly 55 GHz.

Figure 6:
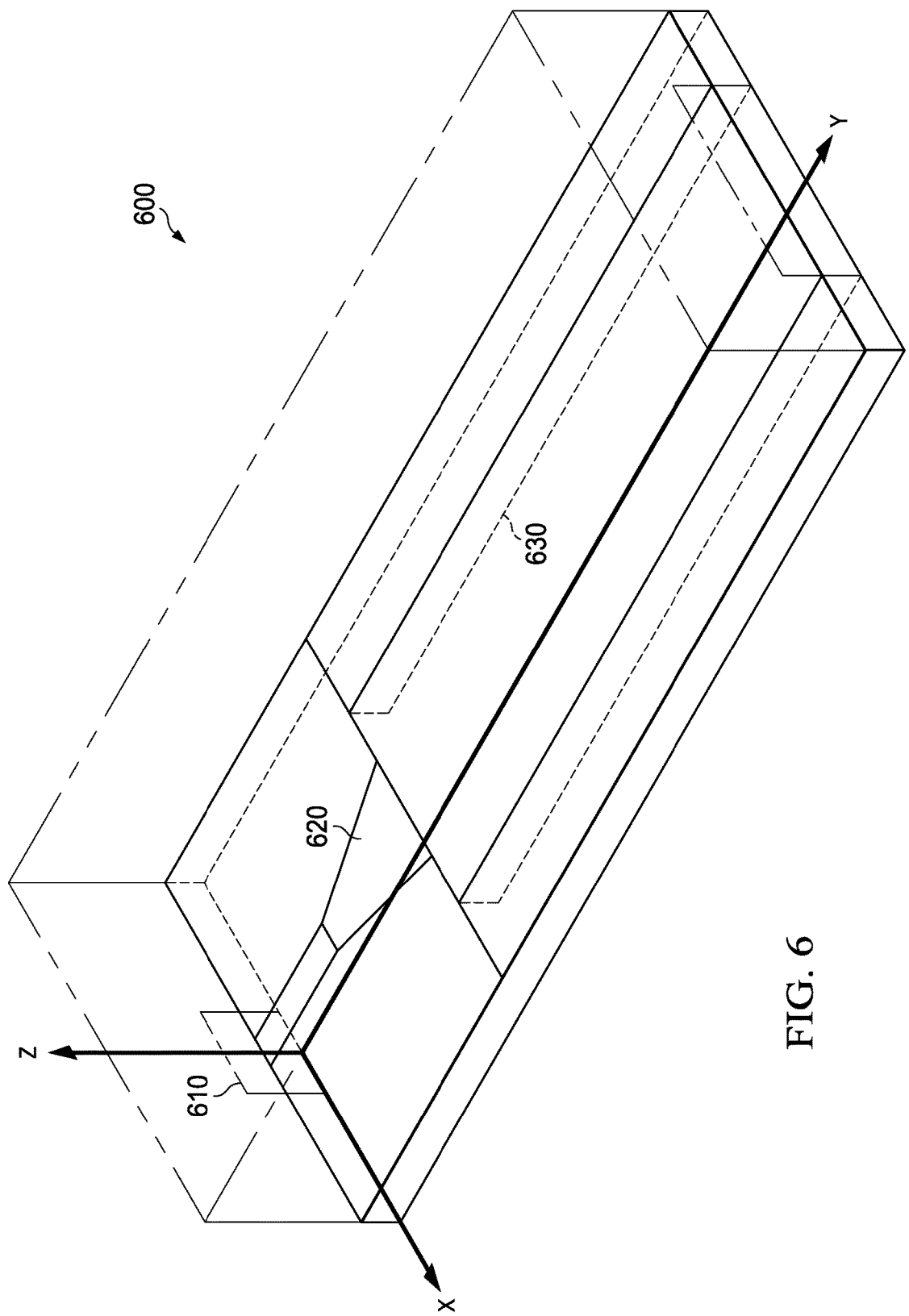
FIG. 6 is a diagram of one embodiment of a substrate integrated waveguide high pass filter.

FIG. 6 is a diagram of one embodiment of a SIW high pass filter (HPF) 600. The SIW structure of HPF 600 is disposed in a dielectric layer. HPF 600 includes an input port 610 and a transition section 620 to a TE mode section 630. A dual-band signal arrives at HPF 600 at input port 610. As the dual-band signal propagates through transition section 620, a TEM mode component converts to a TE mode component that propagates into TE mode section 630.

Figure 7:
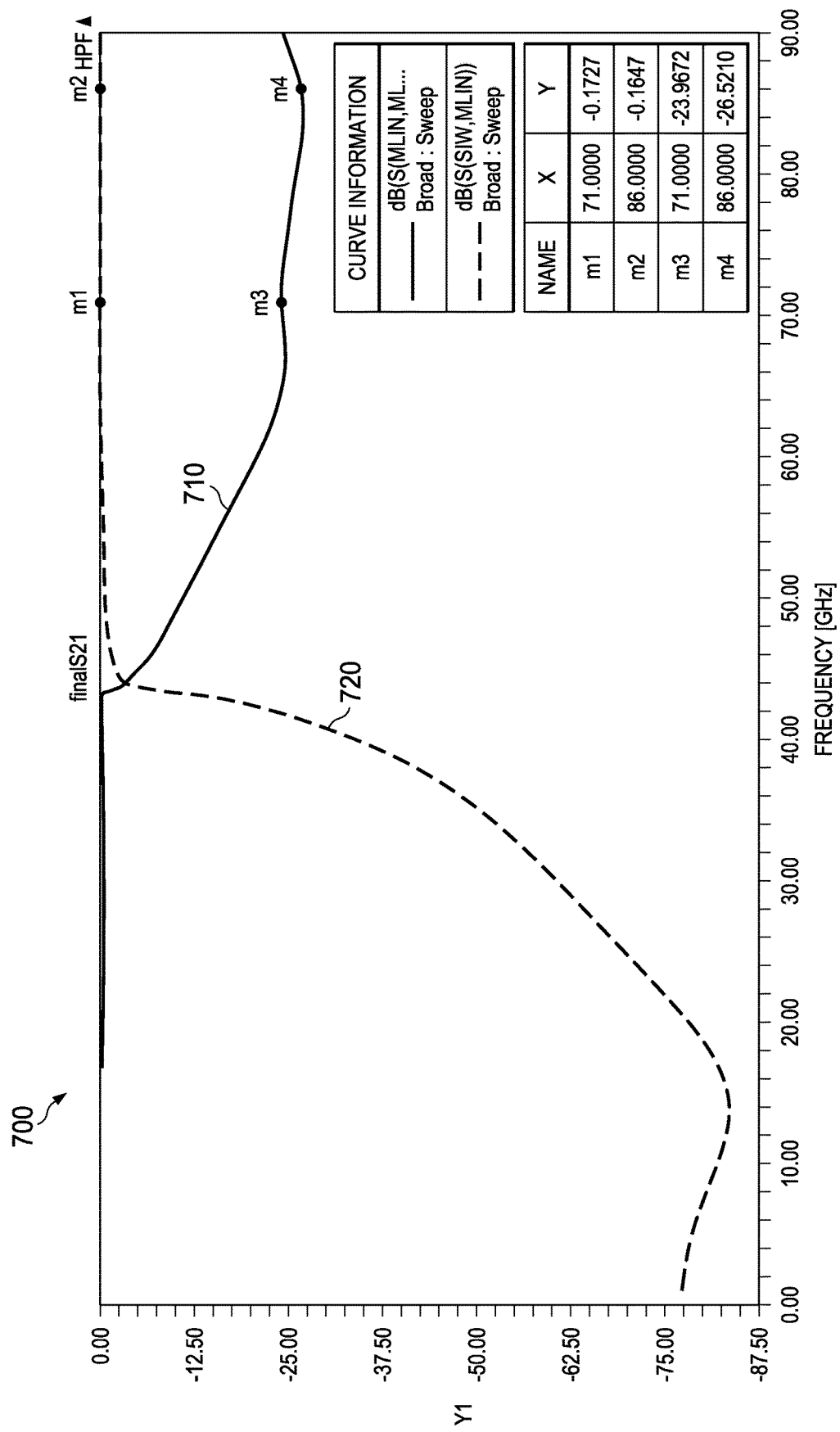
FIG. 7 is a plot of a small signal analysis of one embodiment of a substrate integrated waveguide high pass filter.

FIG. 7 is a plot 700 of a small signal analysis of the SIW HPF embodiment of FIG. 6. Plot 700 plots a frequency response curve, expressed in dBs, against a frequency range expressed in GHz. Plot 700 illustrates a small signal parameter S11 710 and another small signal parameter S21 720. Plot 700 also exhibits a cutoff frequency of roughly 40 GHz.

Figure 8:
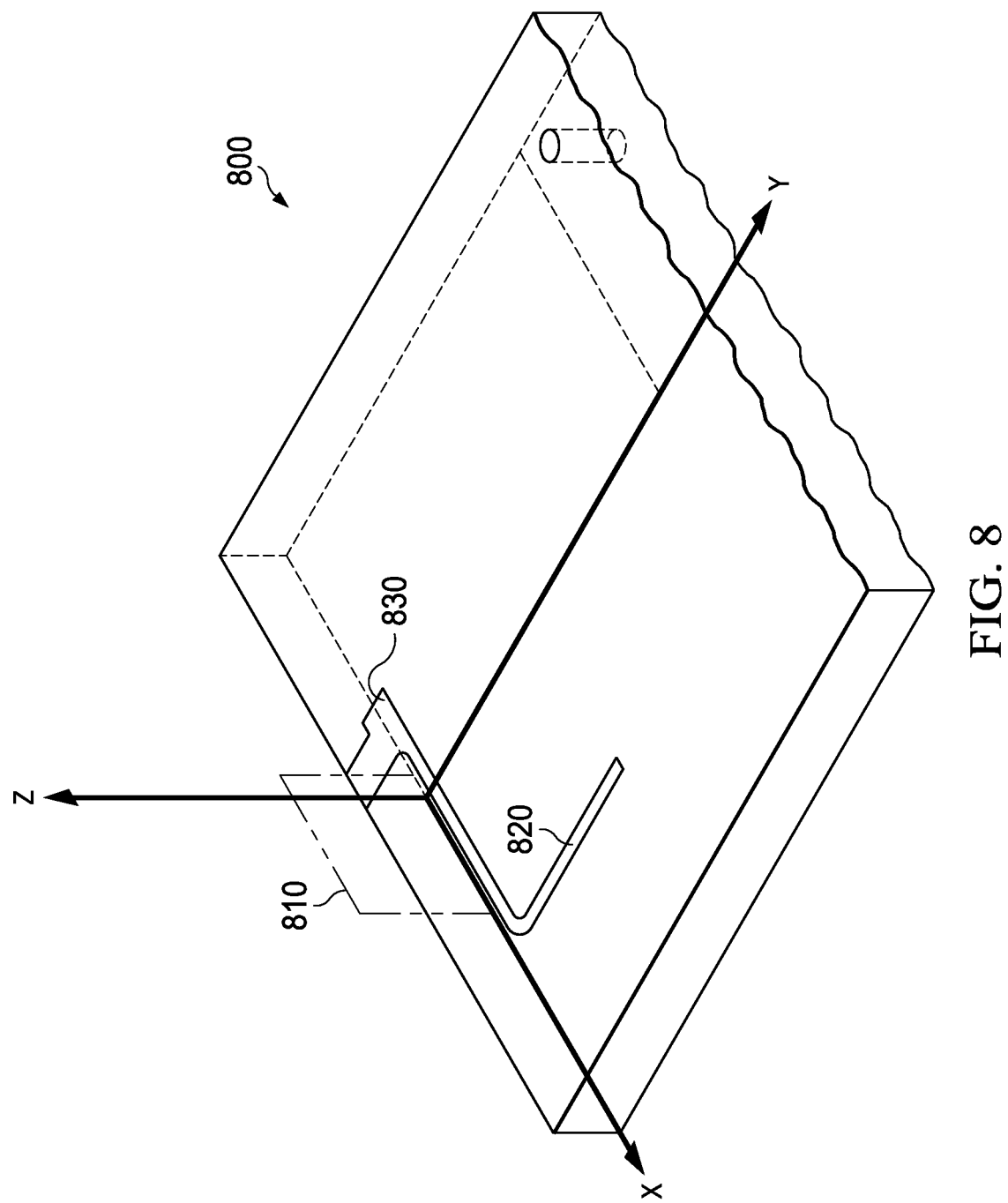
FIG. 8 is a diagram of one embodiment of a T-junction.

FIG. 8 is a diagram of one embodiment of a T-junction 800. T-junction 800 is designed to connect an LPF and HPF to a common port 810. An LPF connects to T-junction 800 at one end 830 and an HPF connects at another end 820. T-junction 800 is implemented, in this embodiment, as a microstrip within a top metallic layer.

Figure 9:
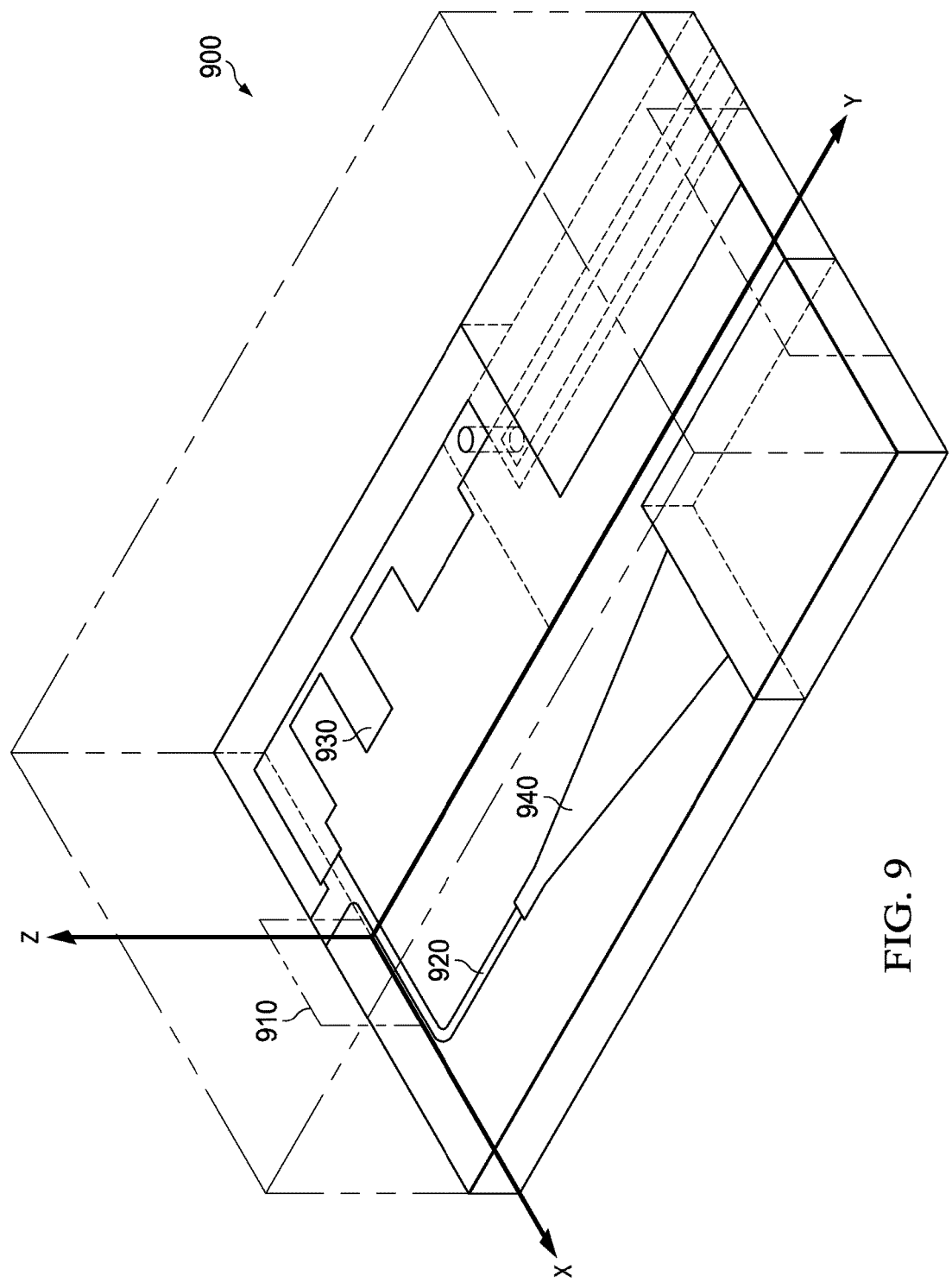
FIG. 9 is a diagram of one embodiment of a millimeter wave diplexer.

FIG. 9 is a diagram of one embodiment of a millimeter wave diplexer 900. Diplexer 900 includes a common input port 910, a T-junction 920, a microstrip line LPF 930, and an SIW HPF. When a dual-band signal arrives at common input port 910, it is split by T-junction 920 to a TE mode path that includes SIW HPF 940 and a TEM mode path that includes microstrip line LPF 930. Microstrip line LPF 930 includes a distributed L-C circuit configured to propagate a TEM mode component of the dual-band signal. The distributed L-C circuit is also designed with a cutoff frequency corresponding to the frequency band for the TEM mode path. SIW HPF 940 includes a transition section configured to convert a TEM mode component of the dual-band signal to a TE mode component. SIW HPF 940 is configured to propagate the TE mode component with a cutoff frequency corresponding to the frequency band for the TE mode path.

Figure 10:
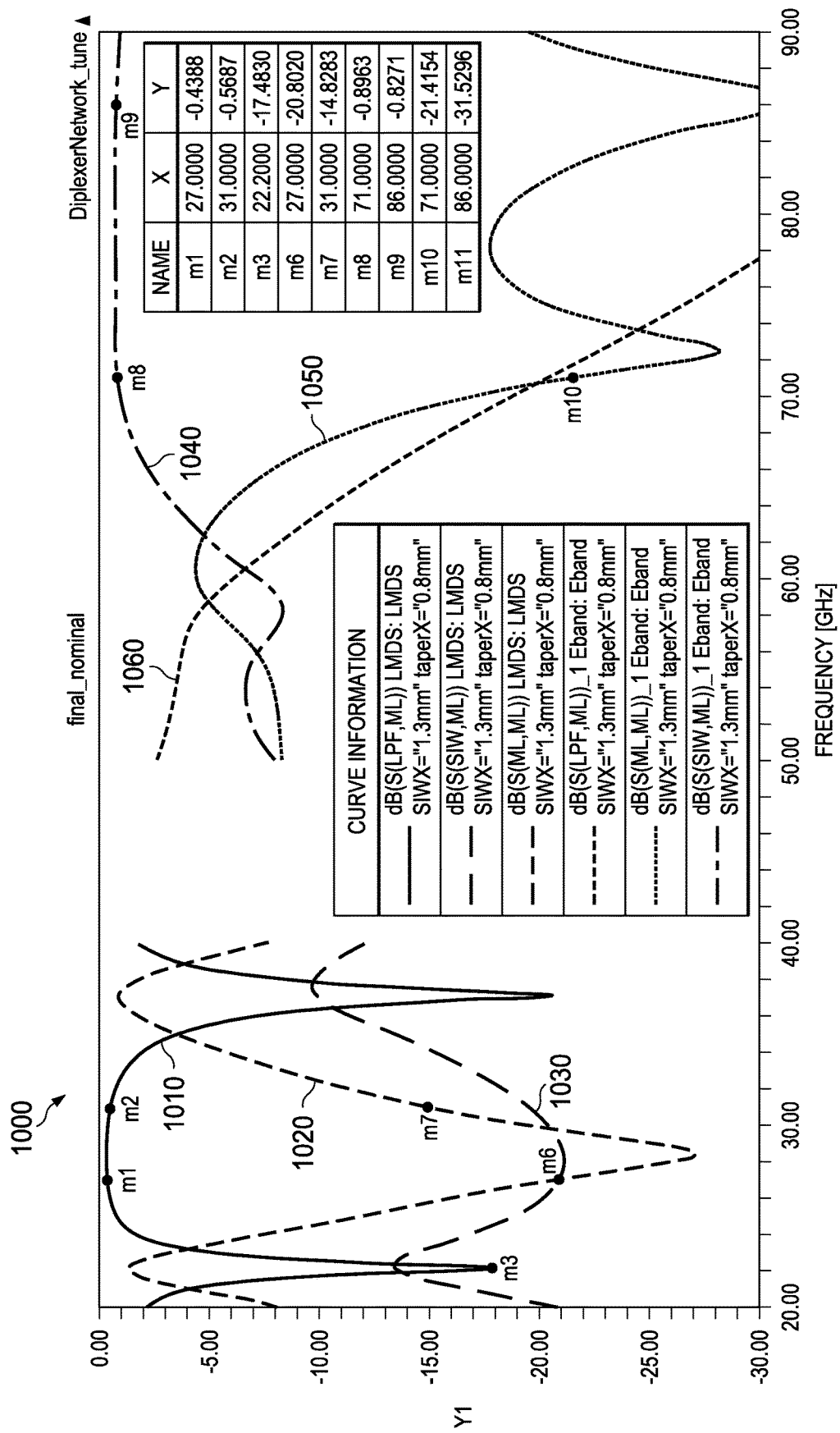
FIG. 10 is a plot of a small signal analysis of one embodiment of a millimeter wave diplexer.

FIG. 10 is a plot 1000 of a small signal analysis of the embodiment diplexer 900 of FIG. 9. Plot 1000 plots a frequency response curve, expressed in dBs, against a frequency range expressed in GHz. Plot 1000 includes small signal parameters for the microstrip line LPF and small signal parameters for the SIW HPF. The small signal parameters for the microstrip line LPF are on the low end of the frequency axis, including a small signal parameter S21 1010 representing the TEM mode component, a small signal parameter S11 1020 also representing the TEM mode, and a small signal parameter S21 1030 representing the TE mode component. The small signal parameters for the SIW HPF are shown on the high end of the frequency axis, including a small signal parameter S21 1040 representing the TE mode component, small signal parameter S11 1050 also representing the TE mode component, and a small signal parameter S21 1060 representing the TEM mode component.

Figure 11:
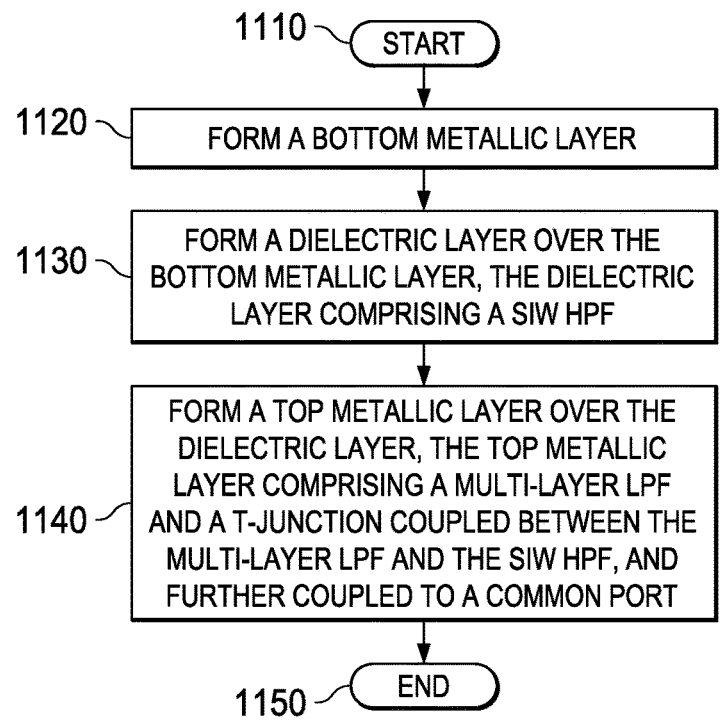
FIG. 11 is a flow diagram of one embodiment of a method of constructing a millimeter wave diplexer.

FIG. 11 is a flow diagram of one embodiment of a method of constructing a millimeter wave diplexer. The method begins at a start step 1110. At a first forming step 1120, a bottom metallic layer is formed. At a second forming step 1130, a dielectric layer is formed over the bottom metallic layer. The dielectric layer includes a SIW structure embodying a HPF. The SIW HPF has a cutoff frequency corresponding to a first frequency band. The SIW HPF is configured to convert a TEM mode component of a dual-band signal to a TE mode signal. The SIW structure is configured to propagate the TE mode component.

At a third forming step 1140, a top metallic layer is formed over the dielectric layer. The top metallic layer includes a microstrip-line LPF and a T-junction. The T-junction couples a microstrip line common port to the microstrip line LPF and the SIW HPF. The microstrip line LPF includes a distributed L-C circuit having poles designed with a cutoff frequency corresponding to a second frequency band for the LPF. The microstrip line LPF is configured to propagate a TEM mode component of a dual-band signal. The method ends at an end step 1150.

Figure 12:
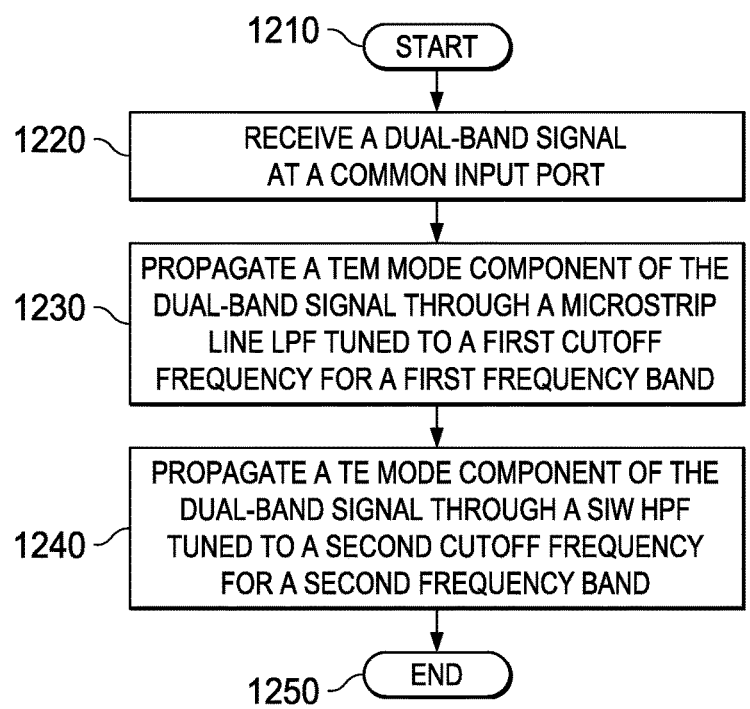
FIG. 12 is a flow diagram of one embodiment of a method of diplexing a dual-band signal.

FIG. 12 is a flow diagram of one embodiment of a method of diplexing a dual-band signal. The method begins at a start step 1210. At a receiving step 1220 the dual-band signal is received at a common input port. The common input port, in certain embodiments, can be implemented as a microstrip line port. The dual-band signal is split by a junction into a TEM mode path and a TE mode path.

At a TEM propagation step 1230, a TEM mode component of the dual-band signal is propagated through a microstrip line LPF. The LPF is tuned to a first cutoff frequency for a first frequency band. The LPF, in certain embodiments, can be embodied in a microstrip line distributed L-C circuit. The poles of the distributed L-C circuit would correspond to the first cutoff frequency. The microstrip line LPF can be embodied in a two layer structure, including bottom and top metallic layers separated by a dielectric layer. The microstrip line LPF can be disposed, for example, on the top metallic layer.

At a TE propagation step 1240, a TE mode component of the dual-band signal is propagated through a SIW HPF. The HPF is tuned to a second cutoff frequency for a second frequency band. The SIW HPF converts the TEM mode component of the dual-band signal into the TE mode component through a transition region of the SIW structure. The TE mode component then propagates through the SIW structure.

In alternative embodiments, the TEM and TE mode components of the dual-band signal are output from the diplexer through a co-located output port into a dual-mode structure. In other embodiments, the output ports for the TEM and TE mode components are separated. The method ends at an end step 1250.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A millimeter wave diplexer, comprising:
   a bottom metallic layer;
   a dielectric layer coupled between the bottom metallic layer and a top metallic layer, the dielectric layer comprising a substrate integrated waveguide (SIW) high pass filter (HPF) coupled to a first port and operable in a first frequency band; and
   the top metallic layer, comprising:
      a microstrip line distributed L-C circuit low pass filter (LPF) coupled to a second port, and operable in a second frequency band; and
      a T-junction coupled between the SIW HPF and the microstrip line distributed L-C circuit LPF on an opposite side of the first and second ports, respectively, and coupled to a common port.

2. The millimeter wave diplexer of claim 1 wherein the SIW HPF is configured to propagate a transverse electrical (TE) mode signal in the first frequency band.

3. The millimeter wave diplexer of claim 2 wherein the SIW HPF is further configured to convert a transverse electromagnetic (TEM) mode signal from the common port to the TE mode signal at the first port.

4. The millimeter wave diplexer of claim 1 wherein the microstrip line distributed L-C circuit LPF is configured to propagate a transverse electromagnetic (TEM) mode signal in the second frequency band.

5. The millimeter wave diplexer of claim 1 wherein the first frequency band comprises an E-band.

6. The millimeter wave diplexer of claim 1 wherein the second frequency band comprises a local multipoint distribution service (LMDS) band.

7. The millimeter wave diplexer of claim 1 wherein the first frequency band is distinct from the second frequency band.

8. The millimeter wave diplexer of claim 1 wherein the first port and the second port are co-located.

9. The millimeter wave diplexer of claim 1, further comprising a via coupling the microstrip line distributed L-C circuit LPF on the top metallic layer to a pad on the bottom metallic layer.

10. The millimeter wave diplexer of claim 1 wherein the common port comprises a microstrip line port.

11. A method of constructing a millimeter wave diplexer, comprising:
    forming a bottom metallic layer;
    forming a dielectric layer over the bottom metallic layer, wherein the dielectric layer comprises a substrate integrated waveguide (SIW) high pass filter (HPF) operable in a first frequency band; and
    forming a top metallic layer over the dielectric layer, wherein the top metallic layer comprises:
       a microstrip line distributed L-C circuit low pass filter (LPF) operable in a second frequency band, and
       a T-junction coupled between the microstrip line distributed L-C circuit LPF and the SIW HPF, and further coupled to a common port.

12. The method of claim 11 wherein the second frequency band comprises a local multipoint distribution service (LMDS) band.

13. The method of claim 11, further comprising forming a via coupling the microstrip line distributed L-C circuit LPF on the top metallic layer to a pad on the bottom metallic layer.

14. The method of claim 11 wherein the SIW HPF is configured to propagate a transverse electrical (TE) mode signal in the first frequency band.

15. The method of claim 14 wherein the SIW HPF is further configured to convert a transverse electromagnetic (TEM) mode signal from the common port to the TE mode signal at a first port.

16. The method of claim 11 wherein the microstrip line distributed L-C circuit LPF is configured to propagate a transverse electromagnetic (TEM) mode signal in the second frequency band.

17. The method of claim 11 wherein the first frequency band comprises an E-band.

18. A method of diplexing a dual-band signal, comprising:
    receiving the dual-band signal at a common input port;
    propagating a transverse electromagnetic (TEM) mode component of the dual-band signal through a microstrip line low pass filter (LPF) tuned to a first cutoff frequency for a first frequency band, wherein propagating the TEM mode component comprises passing the TEM mode component through a distributed L-C circuit having poles corresponding to the first cutoff frequency; and
    propagating a transverse electrical (TE) mode component of the dual-band signal through a substrate integrated waveguide (SIW) high pass filter (HPF) tuned to a second cutoff frequency for a second frequency band, wherein propagating the TE mode component comprises converting the TEM mode component to a TE mode component.

19. The method of claim 18 wherein the receiving the dual-band signal comprises receiving, at the common input port, the transverse electromagnetic (TEM) mode component in the first frequency band and the transverse electrical (TE) mode component in the second frequency band, wherein the first frequency band and the second frequency band are distinct frequency bands.

20. The method of claim 18 wherein the first frequency band comprises an E-band.

21. The method of claim 18 wherein the second frequency band comprises a local multipoint distribution service (LMDS) band.

22. The method of claim 18 further comprising splitting the dual-band signal at the common input port with a T-junction before propagating the TEM and TE mode components.

23. The method of claim 18, further comprising propagating the TEM mode component to a first port after the microstrip line LPF, and propagating the TE mode component to a second port after the SIW HPF, wherein the first and second ports are co-located.

\* \* \* \* \*